(12) United States Patent
Martin

(10) Patent No.: US 6,261,078 B1
(45) Date of Patent: Jul. 17, 2001

(54) PELLETIZER

(75) Inventor: Nicolas Martin, Markgröningen (DE)

(73) Assignee: Krupp Werner & Pfleiderer GmbH (DE)

( * ) Notice: Subject to any disclaimer, the term of this patent is extended or adjusted under 35 U.S.C. 154(b) by 0 days.

(21) Appl. No.: 09/493,500

(22) Filed: Jan. 28, 2000

(30) Foreign Application Priority Data

Feb. 6, 1999 (DE) .............................................. 199 04 898

(51) Int. Cl.[7] ....................................................... B29B 9/06
(52) U.S. Cl. ..................... 425/192 R; 425/196; 425/313; 425/DIG. 230
(58) Field of Search .............................. 425/190, 192 R, 425/196, 192 S, 310, 311, 313, DIG. 230

(56) References Cited

U.S. PATENT DOCUMENTS 5,146,831 * 9/1992 Fetter, Jr. et al. ...................... 83/698

FOREIGN PATENT DOCUMENTS

| 41 05 375A1 | 8/1992 | (DE) . |
| 41 16 933A1 | 11/1992 | (DE) . |
| 42 11 348A1 | 10/1993 | (DE) . |
| 44 08 235 C1 | 2/1995 | (DE) . |
| 44 27 681A1 | 2/1995 | (DE) . |

* cited by examiner

Primary Examiner—Nam Nguyen
Assistant Examiner—Joseph S. Del Sole
(74) Attorney, Agent, or Firm—Robert F.I. Conte; Lee, Mann, Smith, McWilliams, Sweeney & Ohlson

(57) ABSTRACT

A pelletizer comprises a knife head, which is mounted by a denture coupling on a rotatably drivable shaft. The denture coupling comprises at least one serrated ring mounted on the knife head and on the shaft, respectively, the serrated rings having a frontal tooth system and intermeshing. Furthermore, a chucking arrangement of the type of a collect chuck is provided for releasably locking the knife head and the shaft in the direction of their axis.

10 Claims, 4 Drawing Sheets

PELLETIZER

BACKGROUND OF THE INVENTION

1. Field of the Invention

The invention relates to a pelletizer comprising a housing; a pelletizing hood; a knife head, which is disposed in the pelletizing hood; a rotatably drivable shaft mounted in the housing, which shaft has a central longitudinal axis in common with the knife head, and on the front of which the knife head is mounted non-rotatably and releasably.

2. Background Art

Prior public use discloses to fasten the knife head of a pelletizer by means of screws, which are screwed frontally into the shaft. Torque transmission takes place by means of a feather key or a splined shaft connection. Large pelletizers will need several feather keys for torque transmission, which reduces the carrying capacity of the shaft and the knife head. Further, mounting bulky and heavy parts is very complicated in large pelletizers. Accurate alignment of the shaft and the knife head relative to each other is necessary prior to the assembly. Automatization of replacement is rendered complicated and expensive by the use of screws.

SUMMARY OF THE INVENTION

It is an object of the invention to embody a pelletizer of the generic type such that mounting and dismounting the knife head is feasible rapidly and easily.

According to the invention, this object is attained in that the shaft and the knife head are coupled with each other non-rotatably by a denture coupling, which, on the knife head and on the shaft, respectively, comprises at least one serrated ring with a frontal tooth system, the frontal tooth systems being turned toward each other and inteimeshing; and in that a chucking arrangement of the type of a collet chuck is provided for releasably locking the knife head and the shaft in the direction of the axis. The measures according to the invention ensure simple mounting and dismounting of the knife head on the shaft. The knife head only has to be placed on the associated end of the shaft; the frontal tooth systems of the serrated rings, which are turned toward, and allocated to, each other, engage automatically with each other. Then only the chucking arrangement has to be operated for the knife head and the shaft to be clamped together in the direction of the axes, as a result of which the torque connection is simultaneously fixed between the knife head and the shaft, namely between the intermeshing frontal tooth systems of the serrated rings. Once the chucking arrangement has been released, the knife head can simply be detached. The frontal tooth systems have a surface which exceeds by far any feather key connection, ensuring high carrying capacity and important torque transmission.

Special advantages are offered by the use of a serration. An especially compact design is obtained when the chucking arrangement is disposed within the serrated rings. In the case of fluidic actuation of the chucking arrangement by the shaft, the chucking arrangement applies a gripping power which is precisely defined by the pressure of the pressure fluid and acts in the direction of the axis so that defects in assembling as they may be produced by not correctly tightened screws are avoided. This design further ensures automatic mounting and dismounting of the knife head; but it also facilitates the manual replacement of the knife head.

Details of the invention will become apparent from the ensuing description of an exemplary embodiment, taken in conjunction with the drawing.

DESCRIPTION OF THE PREFERRED EMBODIMENT

Figure 1:
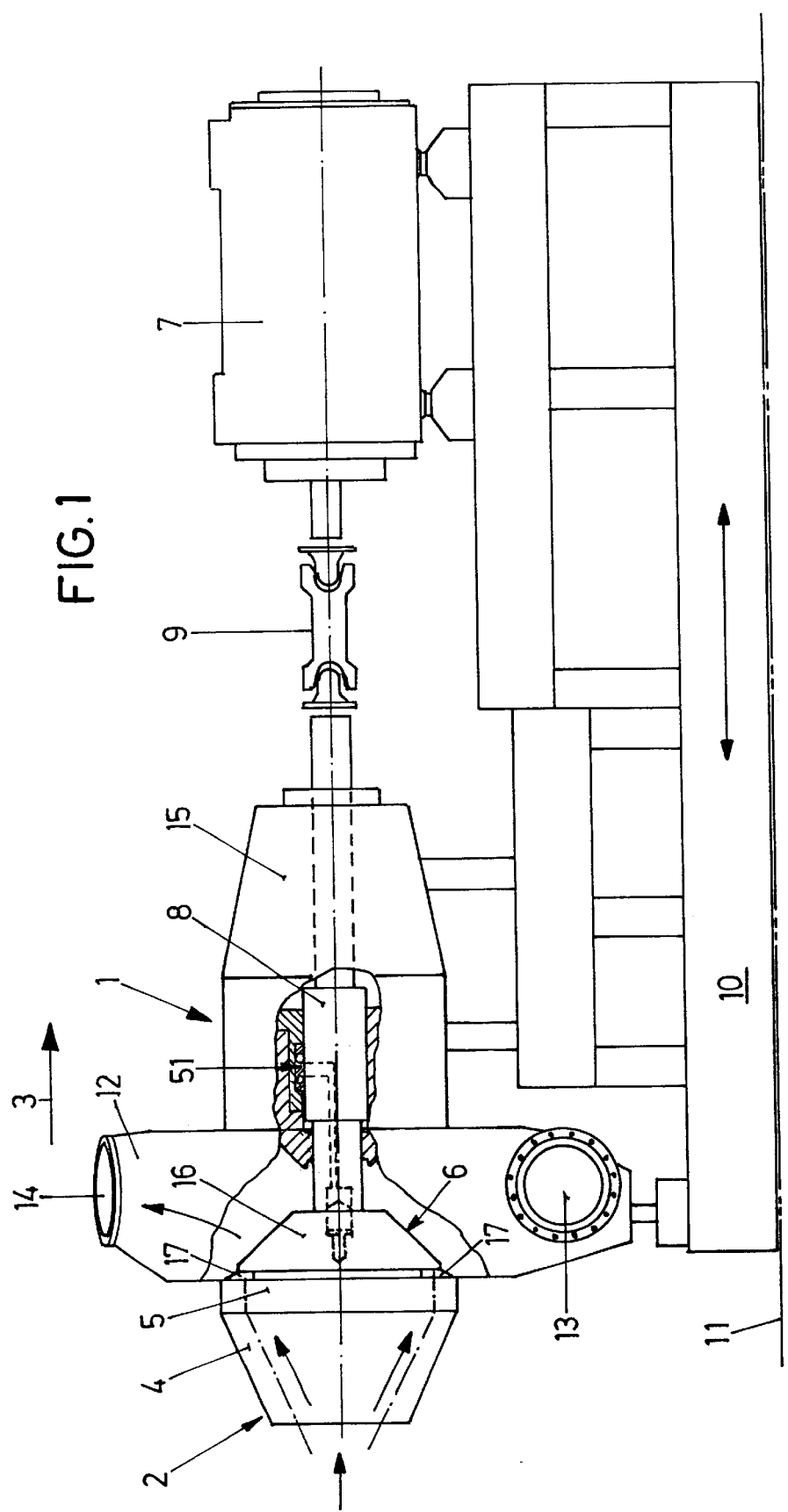
FIG. 1 is a lateral longitudinal view of a pelletizing plant.

The pelletizing plant seen in FIG. 1 comprises a pelletizer 1, which is disposed in the direction of production 3 downstream of an extruder 2, of which only a pelletizing die head 4 with a stationary pelletizing die 5 are shown.

The pelletizer 1 comprises a knife head 6 driven by a drive 7 in the form of an electric motor via a shaft 8, in which a coupling 9 is inserted. The drive 7 and the pelletizer 1 are disposed on a carriage 10, which is movable on the foundation 11 for example in the form of rails from the position of operation seen in FIG. 1 in the direction of production 3 into a position in which it is spaced from the pelletizing die head 4.

The pelletizer comprises a pelletizing hood 12, which encircles the knife head 6 and which is provided with a lower water inlet 13 and an upper water outlet 14. In the direction toward the drive 7, the pelletizing hood 12 is followed by a bearing housing 15, in which the shaft 8 is run as usual. As far as heretofore described, the pelletizing plant is a known and general practice.

The knife head 6 comprises a knife carrier 16, which is called a blade impeller in practice because of its impeller type appearance and which is provided, on the front turned toward the pelletizing die head 4, with knives 17 which, during pelletization, brush at a high speed over the front, turned toward them, of the pelletizing die 5, cutting the strands of plastic melt from the pelletizing die 5 into pellets which are conveyed to the water outlet 14 and out of it by the water, which enters the pelletizing hood 12 through the water inlet 13. This too corresponds to technology that is general practice.

Figure 2:
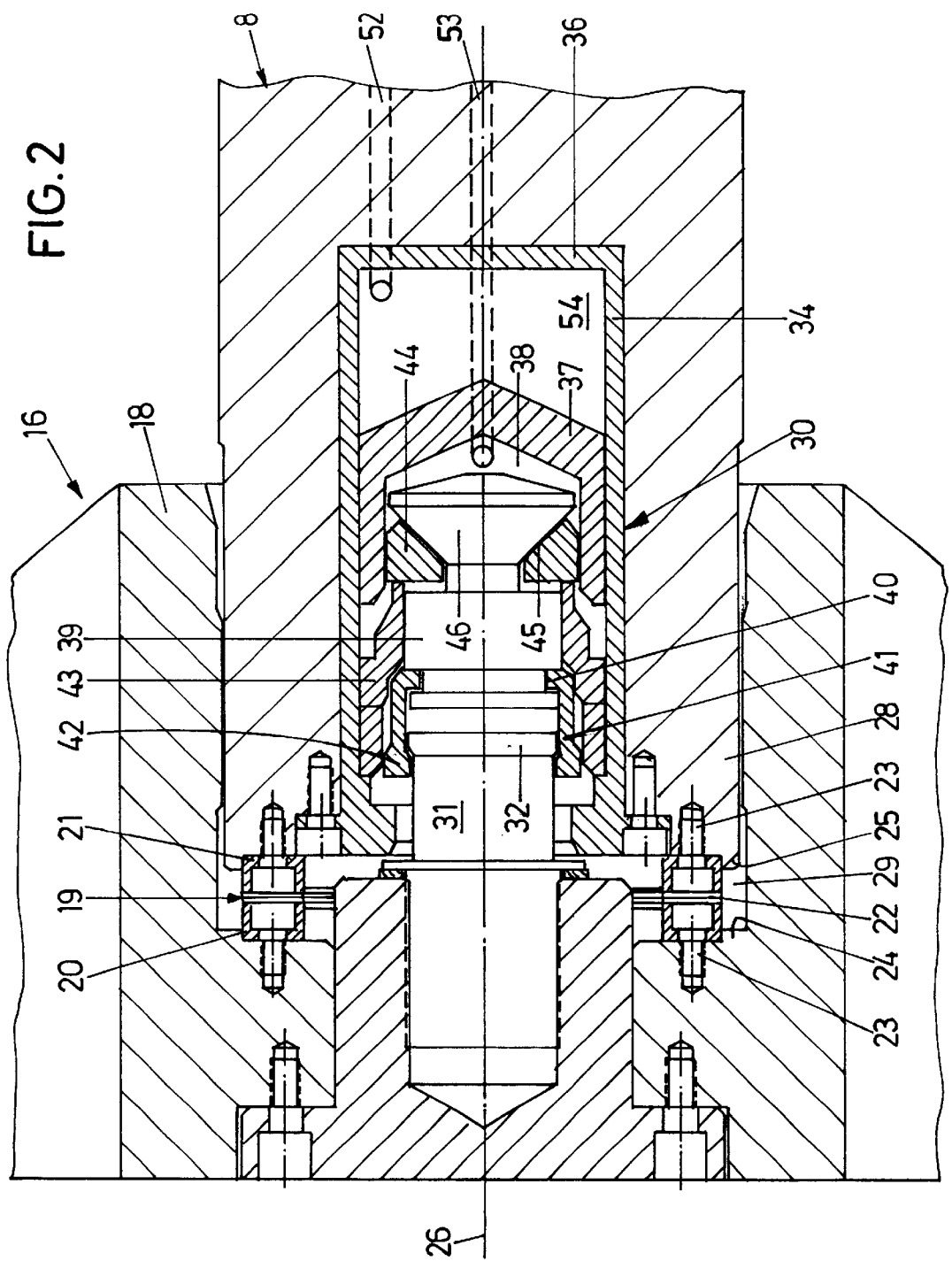
FIG. 2 is a lengthwise section through a chucking arrangement for the connection of the knife head and the shaft in the locked condition of the chucking arrangement.
Figure 3:
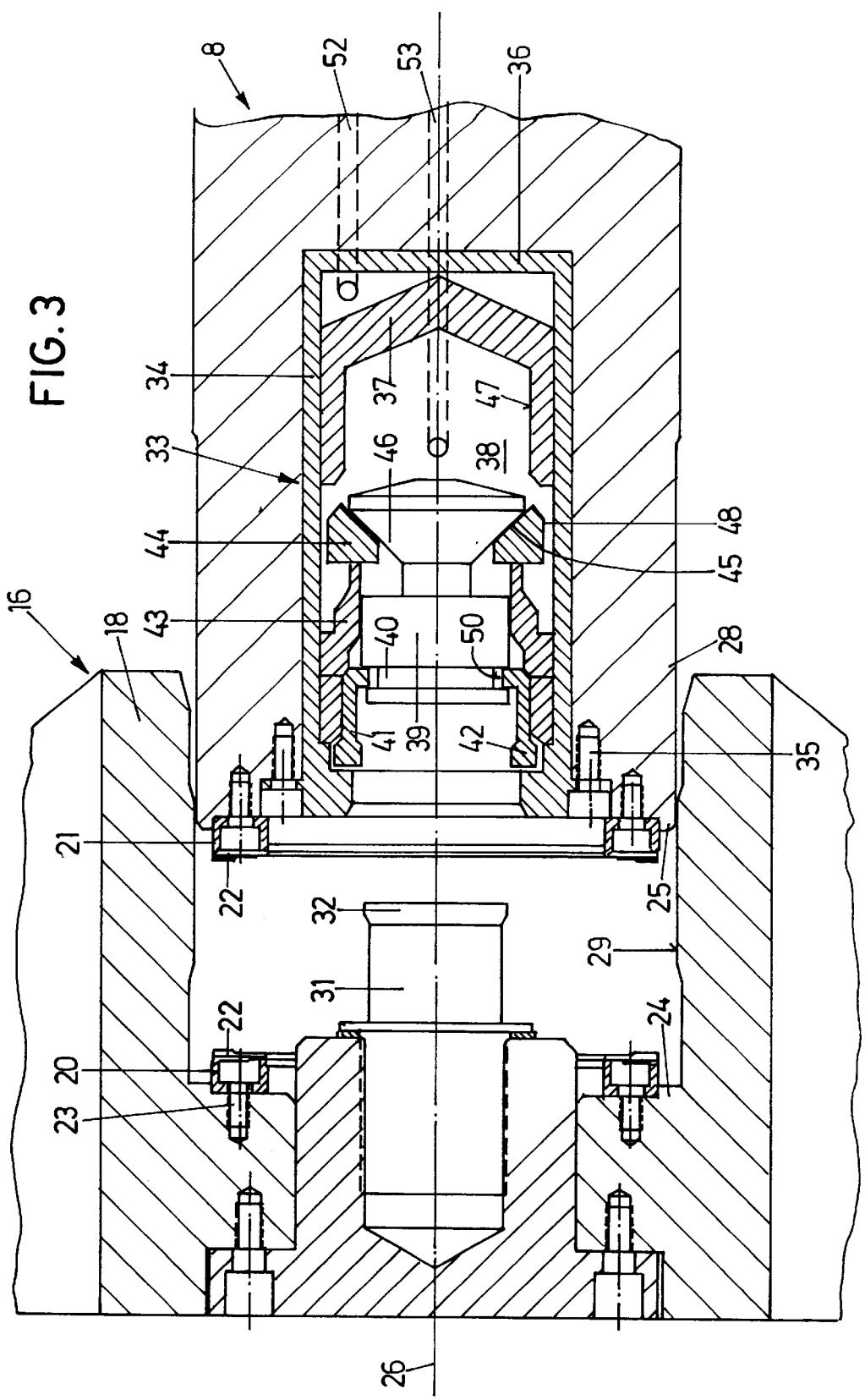
FIG. 3 is a lengthwise section through the chucking arrangement in the unlocked condition.
Figure 4:
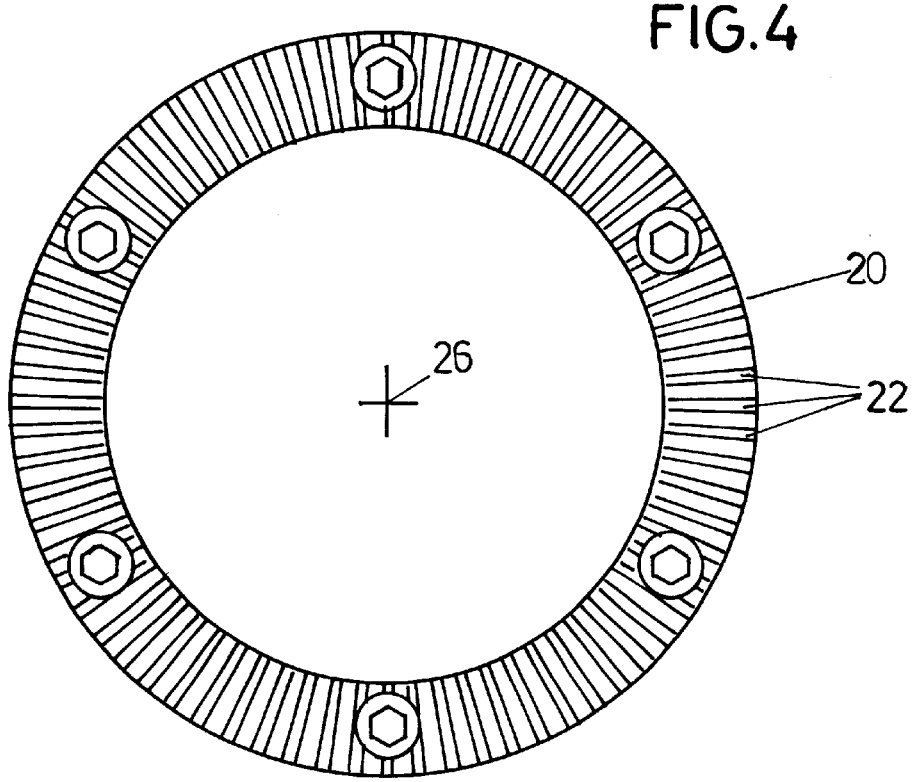
FIG. 4 is a plan view of a serrated ring.

The knife carrier 16 has a cup-shaped hub 18 which is open toward the shaft 8 so that the associated end of the shaft 8 can be led into the hub 18. A denture coupling 19 helps obtain a connection against rotation between the shaft 8 and the hub 18 and thus the knife head 6. This denture coupling 19 substantially comprises two serrated rings 20, 21, each of which is provided with a frontal tooth system 22 in the form of a so-called Hirth serration. One serrated ring 20 is fixed by screws 23 to the bottom 24 of the hub 18, whereas the other serrated ring 21 is also fixed by screws 23 to the front 25 of the shaft 8. The two serrated rings 20, 21 have the same diameter and, as seen in FIG. 4, identical front serrations 22 extending radially to the central longitudinal axis 26 of the knife head 6 and the shaft 8. By its cylindrical coupling end 28 which adjoins the front 25, the shaft 8, in the position of operation seen in FIG. 2, is centered radially to the axis 26 in the suited cylindrical recess 29 of the hub 18, the frontal tooth systems 22 of the two serrated rings 20, 21 inteimeshing. In the position of operation seen in FIG. 2, the hub 18 and thus the knife head 6 is tightly, but releasably connected to the coupling end 28 and thus to the shaft 8 in the direction of the axis 26 by means of a chucking arrangement 30.

The chucking arrangement 30 is disposed radially within the serrated rings 20, 21 and concentrically of the axis 26 and comprises a locking pin 31 which is tightly mounted on the bottom 24 of the hub 18 and projects beyond the bottom 24 in the direction toward the shaft 8. For being locked, the pin 31 comprises, on its end turned toward the coupling end 28, an annular locking projection 32 which stands out radially to the axis 26.

Figure 5:
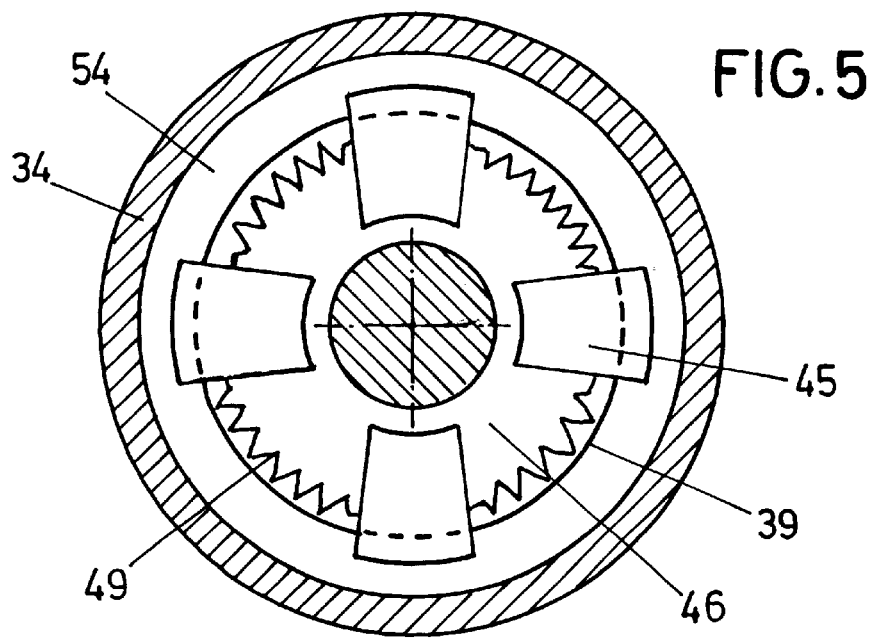
FIG. 5 is a partial cross-sectional view through a chucking device of the chucking arrangement.

A chucking device 33, which is in practice called a collet chuck, is disposed in the equally cup-shaped coupling end 28, which is open toward the hub 18. This chucking device 33 comprises a cylindrical housing 34, which is inserted into the coupling end 28, where it is held in place by means of screws 35 screwed into the front 25. A cup-shaped locking piston 37, which is sealed toward the inner wall of the housing 34, is guided in the direction of the axis 26 in the housing 34 in vicinity to the bottom 36 thereof. The locking piston 37 is closed toward the bottom 36. A guide element 39 of the chucking device 33 is disposed on the side, open toward the front 25, of the interior space 38 of the locking piston 37 and is concentric of the axis 26. In the portion turned toward the front 25, it has a circumferential groove 40, in which collet elements 41 are held and guided firmly in the direction of the axis 26, but for displacement radially thereto. On their free ends which project toward the locking pin 31, these collet elements 41 have clamping jaws 42, which can back up the locking projection 32 of the locking pin 31 as seen in FIG. 2. The collet elements 41 are surrounded by a locking bush 43, which is disposed non-displaceably radially to the axis 26, but axially displaceably on the guide element 39. The locking bush 43 is sealed toward the inner wall of the housing 34 and rests sealingly on the guide element 39 so that the interior space 38 is closed in the direction toward the front 25. On the end of the locking bush 43 that is turned toward the locking piston 37, guide jaws 44 are mounted on the locking bush 43, which are displaceable radially to the axis 26 and relative to the bush 43 and which, by a slope 45, are guided on, and bear against, a guide surface 46 of the guide element 39 which widens in the shape of a truncated cone toward the locking piston 37. On their periphery, the guide jaws 44 are provided with pressure surfaces 48, which are adapted to the inner surface 48 of the locking piston 37. As seen in FIG. 5, the guide jaws 44 are connected to each other by means of prestressed tension springs 49, which exercise a resultant force directed radially to the axis 26 on the guide jaws. Disposed between the guide element 39 and the collet elements 41—for example in the circumferential groove 40—are prestressed compression springs 50, which exercise a force that is directed radially away from the axis 26 on the collet elements 41.

Mounted in the bearing housing 15 is a commercial pressure oil supply 51 which encloses the shaft 8 and is disposed tightly thereon for the supply and discharge of pressure fluid. It is connected to two channels which are formed in the shaft 8, namely a locking channel 52 and an unlocking channel 53. The locking channel 52 leads into the housing 34 between the bottom 36 thereof and the locking piston 37. The unlocking channel 53 leads into the interior space 38 in the vicinity of the locking bush 43.

For the release of the non-rotatable connection, seen in FIG. 2, between the shaft 8 and the knife head 6, pressure oil is forced as a pressure fluid via the unlocking channel 53 into the interior space 38. Simultaneously, the locking channel 52 is open for pressure oil to escape that is in the housing space 54 between the bottom 36 of the housing 34 and the locking piston 37. The locking piston 37 is displaced in the direction toward the bottom 36 of the housing 34, whereas the guide element 39 is displaced in the direction toward the front 25 of the shaft 8. In this way, the clamping jaws 42 of the collet elements are free from the locking bush 43 so that the collet elements 41 are pushed outwards radially to the axis 26 by the compression springs 50. As a result, the clamping jaws 42 release the locking projection 32 of the locking pin 31; the knife head 6 can be pulled off the coupling end 28 of the shaft 8 in the direction of the axis 26 and counter to the direction of production 3. The guide jaws 44 have been shifted outwards on the guide surface 46 of the guide element 39 against the force of the tension springs 49.

For the production of a connection between the knife head 6 and the coupling end 28 of the shaft 8, the knife head 6 is pushed on the coupling end 28 until the locking projection 32 of the locking pin 31 has arrived between the collet elements 41. The front serrations 22 of the serrated rings 20, 21 intennesh in the direction of the axis 26. Then compressed oil is supplied to the locking channel 52 while the unlocking channel 53 is open. The locking piston 37 is displaced in the direction towards the guide element 39, it being possible that the compressed oil in the housing space 54 flows off through the unlocking channel 53. The inner surface 47 of the locking piston 37 encompasses the outer pressure surfaces 48 of the guide jaws 44, as a result of which the guide jaws 44—supported by the tension springs 49—migrate radially toward the axis 26, by their inclined motion on the guide surface 46 of the guide element 39 displacing same in the direction toward the locking piston 37, i.e. into the interior space 38 thereof In this way, the collet elements 41 are also moved in the direction toward the bottom 36 and displaced radially inwards by the locking bush 43 so that their clamping jaws 42 back up the respective locking projection 32, simultaneously clamping it in the direction of the axis 26.

What is claimed is:

1. A pelletizer comprising a housing (15);

a pelletizing hood (12);

a knife head (6), which is disposed in the pelletizing hood (12);

a rotatably drivable shaft (8) mounted in the housing (15), which shaft (8) has a central longitudinal axis (26) in common with the knife head (6), and on the front of which the knife head (6) is mounted non-rotatably and releasably, wherein the shaft (8) and the knife head (6) are coupled with each other non-rotatably by a denture coupling (19), which, on the knife head (6) and on the shaft (8), respectively, comprises at least one serrated ring (20, 21) with a frontal tooth system (22), the frontal tooth systems (22) being turned toward each other and intermeshing; and wherein a chucking arrangement (30) is provided for releasably locking the knife head (6) and the shaft (8) in the direction of the axis (26).

2. A pelletizer according to claim 1, wherein the frontal tooth system (22) is a serration.

3. A pelletizer according to claim 1, wherein the chucking arrangement (30) is disposed within the serrated rings (20, 21).

4. A pelletizer according to claim 1, wherein the chucking arrangement (30) is actuated by fluid.

5. A pelletizer according to claim 1, wherein one serrated ring (20) is mounted on the bottom (24) of a cup-shaped hub (18) of the knife head (6).

6. A pelletizer according to claim 1, wherein one serrated ring (21) is mounted on a front (25) of the shaft (8).

7. A pelletizer according to claim 1, wherein the shaft (8) has a cylindrical outer surface; and wherein by that cylindrical outer surface, the shaft (8) is centered in a cylindrical recess (29) of the knife head (6).

8. A pelletizer according to claim 1, wherein the chucking arrangement (30) has a chucking device (33) which is disposed in a coupling end (28), turned toward the knife head (6), of the shaft (8).

9. A pelletizer according to claim 8, wherein a locking pin (31), which engages with the chucking device (33), is mounted in the knife head (6).

10. A pelletizer according to claim 8, wherein a locking channel (52) and an unlocking channel (53), which are connected with the chucking device (33), are formed in the shaft (8) for the supply and discharge of pressure fluid.

* * * * *